US012224453B2

(12) United States Patent
Heo et al.

(10) Patent No.: US 12,224,453 B2
(45) Date of Patent: *Feb. 11, 2025

(54) ELECTRODE ASSEMBLY AND METHOD OF MANUFACTURING THE SAME

(71) Applicant: SAMSUNG SDI CO., LTD., Yongin-si (KR)

(72) Inventors: Kyoungheon Heo, Yongin-si (KR); Kwanseop Song, Yongin-si (KR); Jinho So, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/357,696

(22) Filed: Jul. 24, 2023

(65) Prior Publication Data
US 2023/0369720 A1 Nov. 16, 2023

Related U.S. Application Data

(63) Continuation of application No. 16/682,229, filed on Nov. 13, 2019, now Pat. No. 11,784,378.

(30) Foreign Application Priority Data
Nov. 19, 2018 (KR) ........................ 10-2018-0142977

(51) Int. Cl.
*H01M 50/46* (2021.01)
*H01M 50/417* (2021.01)

(52) U.S. Cl.
CPC ....... *H01M 50/461* (2021.01); *H01M 50/417* (2021.01)

(58) Field of Classification Search
CPC ............. H01M 50/461; H01M 50/417; H01M 10/0413; H01M 10/052; H01M 10/0585; H01M 50/46; H01M 4/04; H01M 10/0404; H01M 10/0436; H01M 10/0463; H01M 50/403; H01M 50/411; Y02E 60/10; Y02P 70/50; C09J 2203/33; C09J 2301/304
See application file for complete search history.

(56) References Cited

U.S. PATENT DOCUMENTS

| 6,433,091 | B1* | 8/2002 | Cheng | C09J 4/00 |
| | | | | 525/445 |
| 6,475,667 | B1 | 11/2002 | Onishi et al. | |
| 9,825,275 | B2 | 11/2017 | Kim et al. | |
| 2004/0257748 | A1 | 12/2004 | Ritter et al. | |
| 2005/0137549 | A1* | 6/2005 | Lindsay | A61F 13/15593 |
| | | | | 604/385.01 |
| 2006/0127774 | A1 | 6/2006 | Kim et al. | |
| 2007/0154790 | A1 | 7/2007 | Jeung et al. | |
| 2008/0274394 | A1 | 11/2008 | Schormann et al. | |
| 2010/0019365 | A1* | 1/2010 | Matsumura | H01L 21/6836 |
| | | | | 438/464 |
| 2011/0037351 | A1 | 2/2011 | Kasai et al. | |
| 2011/0244319 | A1* | 10/2011 | Hashimoto | H01M 10/0436 |
| | | | | 429/186 |
| 2012/0219835 | A1* | 8/2012 | Kawabe | H01M 10/0587 |
| | | | | 429/94 |
| 2012/0308878 | A1 | 12/2012 | Sakashita et al. | |
| 2013/0189561 | A1 | 7/2013 | Kim et al. | |
| 2015/0132631 | A1 | 5/2015 | Lee et al. | |
| 2015/0171393 | A1 | 6/2015 | Ogata et al. | |
| 2016/0043374 | A1 | 2/2016 | Seong | |
| 2016/0104871 | A1* | 4/2016 | Kwon | H01M 50/121 |
| | | | | 429/127 |
| 2016/0218395 | A1 | 7/2016 | Ko et al. | |
| 2017/0069880 | A1 | 3/2017 | Wang et al. | |
| 2017/0244087 | A1 | 8/2017 | Kawabe | |
| 2017/0279113 | A1 | 9/2017 | Ohsawa et al. | |
| 2018/0145376 | A1 | 5/2018 | Jo et al. | |

FOREIGN PATENT DOCUMENTS

| CN | 1799112 A | 7/2006 |
| CN | 101999180 A | 3/2011 |
| CN | 102810689 A | 12/2012 |
| CN | 104412419 A | 3/2015 |
| CN | 106505236 B | 4/2019 |
| EP | 2874225 B1 | 7/2016 |
| JP | 4564118 B2 | 10/2010 |
| KR | 10-0579376 B1 | 5/2006 |
| KR | 10-2007-0073169 A | 7/2007 |
| KR | 10-2013-0085324 A | 7/2013 |

(Continued)

OTHER PUBLICATIONS

Chinese Decision of Rejection, With English translation, dated Jun. 1, 2023, issued in corresponding Chinese Patent Application No. 201911125383.4 (15 pages).

Chinese Office action, with English translation, dated Oct. 8, 2022, issued in corresponding Chinese Patent Application No. 201911125383.4 (19 pages).

Korean Notice of Allowance dated Aug. 12, 2020 issued in corresponding Korean Patent Application No. 10-2018-0142977 (3 pages).

Extended European Search Report for corresponding European Patent Application No. 19210077.4, dated Mar. 23, 2020, 9 pages.

(Continued)

*Primary Examiner* — Muhammad S Siddiquee

(74) *Attorney, Agent, or Firm* — Lewis Roca Rothgerber Christie LLP

(57) ABSTRACT

An electrode assembly includes: a plurality of positive electrodes and a plurality of negative electrodes, alternately and repeatedly stacked; a plurality of separators between the positive electrodes and the negative electrodes, respectively, to protrude from the positive electrodes and the negative electrodes and stacked such that first surfaces at edges thereof face each other; and a fixing member including an adhesive layer adhered to the first surfaces of the separators that are facing each other.

10 Claims, 13 Drawing Sheets

(56) References Cited

FOREIGN PATENT DOCUMENTS

| | | |
|---|---|---|
| KR | 10-2015-0036926 A | 4/2015 |
| KR | 10-2015-0037314 A | 4/2015 |
| KR | 10-2015-0049768 A | 5/2015 |
| KR | 10-2015-0056932 A | 5/2015 |
| KR | 10-1578265 B1 | 12/2015 |
| KR | 10-2016-0019229 A | 2/2016 |
| KR | 10-2016-0042748 A | 4/2016 |
| KR | 10-2016-0046523 A | 4/2016 |

OTHER PUBLICATIONS

Korean Intellectual Property Office action for corresponding Korean Patent Application No. 10-2018-0142977, dated Feb. 20, 2020, 6 pages.
US Office Action dated May 8, 2024, issued in U.S. Appl. No. 17/877,353 (11 pages).
US Office Action dated May 8, 2024, issued in U.S. Appl. No. 18/357,696 (8 pages).
US Office Action dated May 8, 2024, issued in U.S. Appl. No. 18/343,274 (8 pages).

* cited by examiner

ELECTRODE ASSEMBLY AND METHOD OF MANUFACTURING THE SAME

CROSS-REFERENCE TO RELATED APPLICATION

This application is a continuation of U.S. application Ser. No. 16/682,229, filed on Nov. 13, 2019, which claims priority to and benefit of Korean Patent Application No. 10-2018-0142977, filed on Nov. 19, 2018 in the Korean Intellectual Property Office, the entire contents of both of which are incorporated herein by reference.

BACKGROUND

1. Field

Aspects of embodiments of the present invention relate to an electrode assembly and a manufacturing method thereof.

2. Description of the Related Art

A rechargeable battery may be repeatedly charged and discharged, unlike a primary battery. A low-capacity rechargeable battery may be used for small portable electronic devices, such as a mobile phone, a notebook computer, and a camcorder, and a large-capacity rechargeable battery may be used as a power supply for driving a motor, such as for a hybrid or electric vehicle.

Such a rechargeable battery includes an electrode assembly having a structure in which a positive electrode, a separator, and a negative electrode are alternately stacked, a case for accommodating the electrode assembly therein, a cap plate for sealing an opening of the case, and an electrode terminal disposed on the cap plate to be electrically connected to the electrode assembly.

The electrode assembly may have a jelly roll structure formed by being spiral-wound in a state in which a positive electrode, a separator, and a negative electrode are stacked, or may have a stacked structure in which a positive electrode, a separator, and a negative electrode are individually repeatedly stacked.

Among these, the structure of the stacked electrode assembly is formed by repeatedly stacking the positive electrode, the separator, and the negative electrode, which are formed separately, and affects the safety of the secondary battery depending on an alignment state with each other.

Therefore, a tape may be used to wrap and fix the alignment state of the negative electrode, the separator, and the positive electrode of the stacked electrode assembly in order to prevent or reduce misalignment thereof.

However, since the tape is adhered to an end of the thin separator and an adhesive area between the tape and the separator is small, when an external impact or the like is applied, they may not be maintained in alignment.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, an electrode assembly for a rechargeable battery, and a manufacturing method thereof, are provided. According to another aspect of embodiments of the present invention, an electrode assembly and a manufacturing method thereof, capable of minimizing or reducing misalignment of the stacked electrode assembly, are provided.

According to one or more embodiments of the present invention, an electrode assembly includes: a plurality of positive electrodes and a plurality of negative electrodes, alternately and repeatedly stacked; a plurality of separators between the positive electrodes and the negative electrodes, respectively, to protrude from the positive electrodes and the negative electrodes and stacked such that first surfaces at edges thereof face each other; and a fixing member including an adhesive layer adhered to the first surfaces of the separators that are facing each other. The adhesive layer may be spaced apart from ends of the positive electrodes and the negative electrodes.

The adhesive layer may surround ends of the separators.

The fixing member may be adhered to the adhesive layer and may further include an insulating member adhered to an upper surface of an uppermost separator of the plurality of separators and a lower surface of a lowermost separator of the plurality of separators.

The adhesive layer may be arranged at a regular interval along the edge.

The adhesive layer may be continuously linear in a direction in which the separators overlap.

The adhesive layer may be inclined with respect to the direction in which the separators overlap.

The separator may include a polyolefin series, and the fixing member may include a polyolefin grafted with maleic anhydride.

According to one or more embodiments of the present invention, a manufacturing method of an electrode assembly includes: forming an electrode assembly by alternately and repeatedly stacking positive electrodes, separators, and negative electrodes; applying a solution-type adhesive to a sidewall of the electrode assembly; and forming an adhesive layer by curing the solution-type adhesive, wherein the solution-type adhesive is applied in a direction in which the separators overlap by using a nozzle-type applicator.

The adhesive layer may include a plurality of adhesive layers arranged at a regular interval.

The adhesive layer may have an area of 95% or less with respect to an area of the sidewall.

The manufacturing method may further include, after the forming of the adhesive layer, attaching an insulating member onto the adhesive layer, and the insulating member may be attached to contact upper and lower surfaces of the electrode assembly.

In the applying of the solution-type adhesive, the solution-type adhesive may be coated to be spaced apart from ends of the positive electrodes and the negative electrodes.

In the forming of the adhesive layer, the curing may include thermosetting or UV curing.

According to one or more embodiments of the present invention, a manufacturing method of an electrode assembly includes: forming an electrode assembly by alternately and repeatedly stacking positive electrodes, separators, and negative electrodes; arranging a fixing member including an adhesive layer and an insulating member on a sidewall of the electrode assembly; and melting and then curing the adhesive layer, wherein the adhesive layer includes a hot melt adhesive.

The fixing member may include a plurality of fixing members arranged at a regular interval.

In the curing, the adhesive layer may be spaced apart from ends of the positive electrodes and the negative electrodes.

According to an aspect of embodiments of the present invention, when the fixing member is formed, the edges of the stacked electrode assembly may be firmly held to minimize or reduce distortion of the alignment of the negative electrode, the positive electrode, and the separator.

DESCRIPTION OF SYMBOLS

Figure 1:
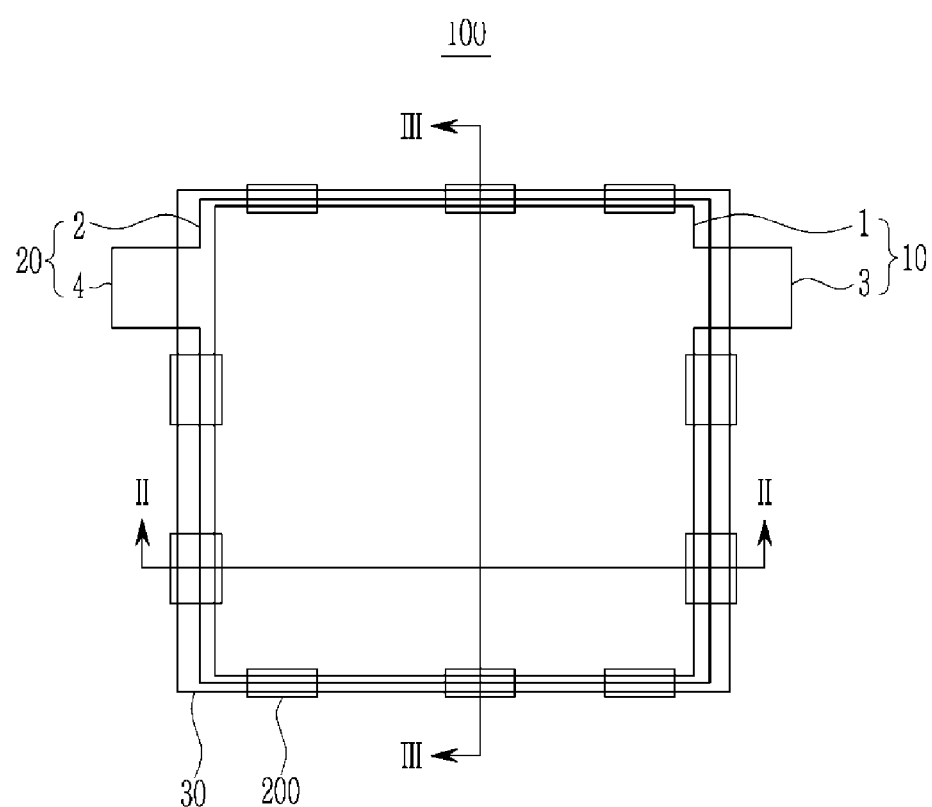
FIG. 1 illustrates a schematic layout view of an electrode assembly according to an embodiment of the present invention.

10: negative electrode
20: positive electrode
22: insulating member
24: adhesive layer
30: separator
100, 101, 102, 103, 104, 105, 106, 107: electrode assembly
200, 201, 202, 203, 204, 205, 206, 207: fixing member
300: nozzle-type applicator

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present invention.

To clearly describe the present invention, parts that are irrelevant to the description may be omitted, and like reference numerals refer to like or similar constituent elements throughout the specification.

Further, since sizes and thicknesses of constituent elements shown in the accompanying drawings may be arbitrarily shown for better understanding and ease of description, the present invention is not limited to the illustrated sizes and thicknesses.

In the drawings, the thicknesses of layers, films, panels, regions, etc., may be exaggerated for clarity. In the drawings, for better understanding and ease of description, the thicknesses of some layers and areas may be exaggerated. It is to be understood that when an element, such as a layer, film, region, or substrate, is referred to as being "on" another element, it may be directly on the other element or one or more intervening elements may also be present.

In addition, unless explicitly described to the contrary, the word "comprise" and variations, such as "comprises" or "comprising," are to be understood to imply the inclusion of stated elements but not the exclusion of any other elements. Further, in the specification, the word "on" means positioning on or below the object portion, but does not necessarily mean positioning on the upper side of the object portion based on a gravity direction.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Herein, a rechargeable battery according to an embodiment of the present invention will be described in further detail with reference to the accompanying drawings.

Figure 2:
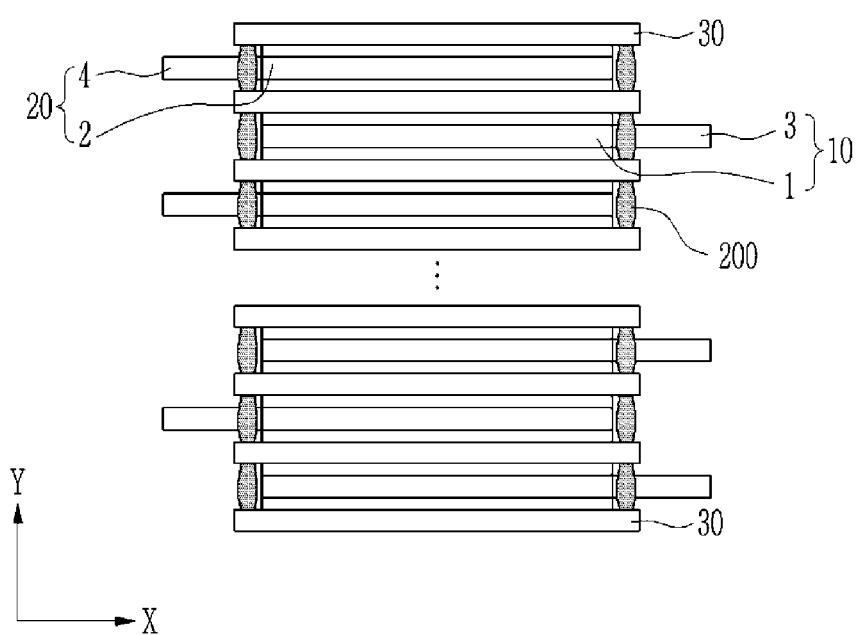
FIG. 2 illustrates a cross-sectional view taken along the line II-II of FIG. 1.

FIG. 1 illustrates a schematic layout view of an electrode assembly according to an embodiment of the present invention; FIG. 2 illustrates a cross-sectional view taken along the line II-II of FIG. 1; and FIG. 3 illustrates a cross-sectional view taken along the line III-III of FIG. 1.

Figure 3:
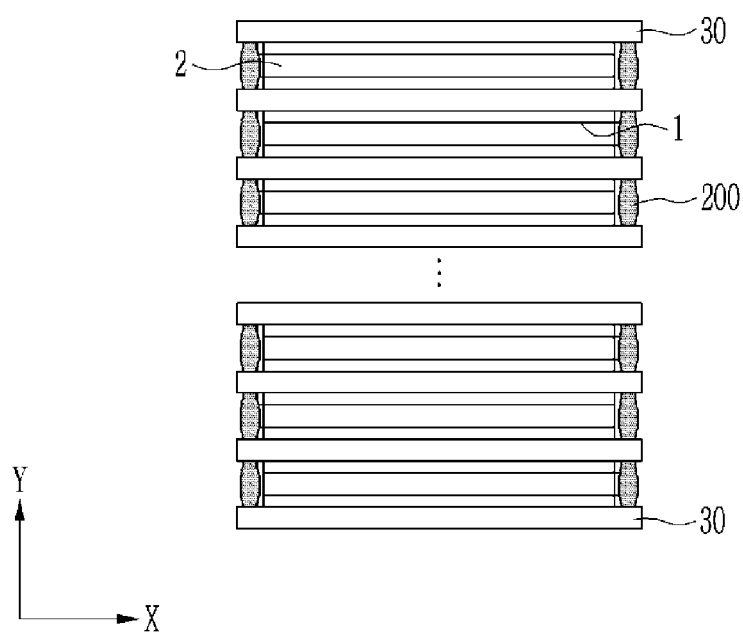
FIG. 3 illustrates a cross-sectional view taken along the line III-III of FIG. 1.

As illustrated in FIGS. 1 to 3, an electrode assembly 100 according to an embodiment of the present invention is a stacked electrode assembly in which a negative electrode 10 and a positive electrode 20 are repeatedly stacked with a separator 30 interposed therebetween.

The separator 30 is a polymer film through which lithium ions pass, and may include, for example, a polyolefin series.

The negative electrode 10 includes an electrode region 1 formed by coating an active material on a current collector of a thin metal plate, and an uncoated region 3 where the thin metal plate is exposed by not coating an active material thereon. In an embodiment, a thin metal plate of the negative electrode may be a thin copper (Cu) plate.

The positive electrode 20 includes an electrode region 2 formed by coating an active material on a current collector of a thin metal plate, and an uncoated region 4 where the thin metal plate is exposed by not coating an active material thereon. In an embodiment, a thin metal plate of the positive electrode may be a thin aluminum (Al) plate.

A plurality of respective uncoated regions 3 and 4 of a same polarity may be electrically connected to an outer terminal. The uncoated region 4 of the positive electrode 20 and the uncoated region 3 of the negative electrode 10 may protrude in opposite directions as illustrated in FIG. 1, but the present invention is not limited thereto, and, in an embodiment, they may protrude in a same direction to be spaced apart from each other.

In an embodiment, the electrode assembly 100 is formed by repeatedly stacking the plurality of positive electrodes 20 and negative electrodes 10 with the separators 30 therebetween, and, thus, they may be fixed by using a fixing member 200 to maintain an aligned state after being stacked.

In an embodiment, the fixing member 200 has an elastic force and includes an adhesive layer made of a material having excellent adhesion to the separator 30, and, in an embodiment, the adhesive layer may include a polyolefin grafted with maleic anhydride having excellent adhesion to the separator 30 made of a polyolefin-based series. In an embodiment, the polyolefin may be any of polypropylene, polyethylene, and ethylene vinyl acetate (EVA).

In an embodiment, the fixing member 200 may be formed at a regular interval along an edge of the separator 30 to facilitate penetration of an electrolyte solution into the electrode assembly 100. In an embodiment, the fixing member 200 may be formed to overlap or form a linear shape (see FIG. 7) in a direction Y crossing at least one sidewall of the electrode assembly 100, which is a substantially rectangular parallelepiped.

The separator 30 may be larger than the negative electrode 10 and the positive electrode 20, and may protrude outward of the negative electrode 10 and the positive electrode 20, while the fixing member 200 may be disposed at the edge of the separator 30, which protrudes.

In an embodiment, the fixing member 200 may be formed at a same position in the direction Y in which a plurality of overlapping separators 30 overlap, that is, across the sidewalls. Accordingly, the fixing member 200 is fixed by contacting a first surface and a second surface of the separators 30 facing each other. In an embodiment, the fixing member 200 is disposed within the boundary of the separator 30 and does not protrude outward.

In one or more embodiments of the present invention, when the fixing member 200 is formed along the edge of the separator 30, the contact area between the separator 30 and the fixing member 200 is increased to firmly hold the separator 30, such that when a shock is applied to the electrode assembly 100 or it moves, the alignment of the positive electrode 20, the negative electrode 10, and the separator 30 of the electrode assembly 100 may be prevented or substantially prevented from being distorted.

In addition, according to one or more embodiments of the present invention, since the fixing member 200 has elasticity, even when the alignment is distorted due to an impact on the electrode assembly 100, the fixing member 200 can be restored to its original alignment state by the elasticity of the fixing member 200.

Figure 4:
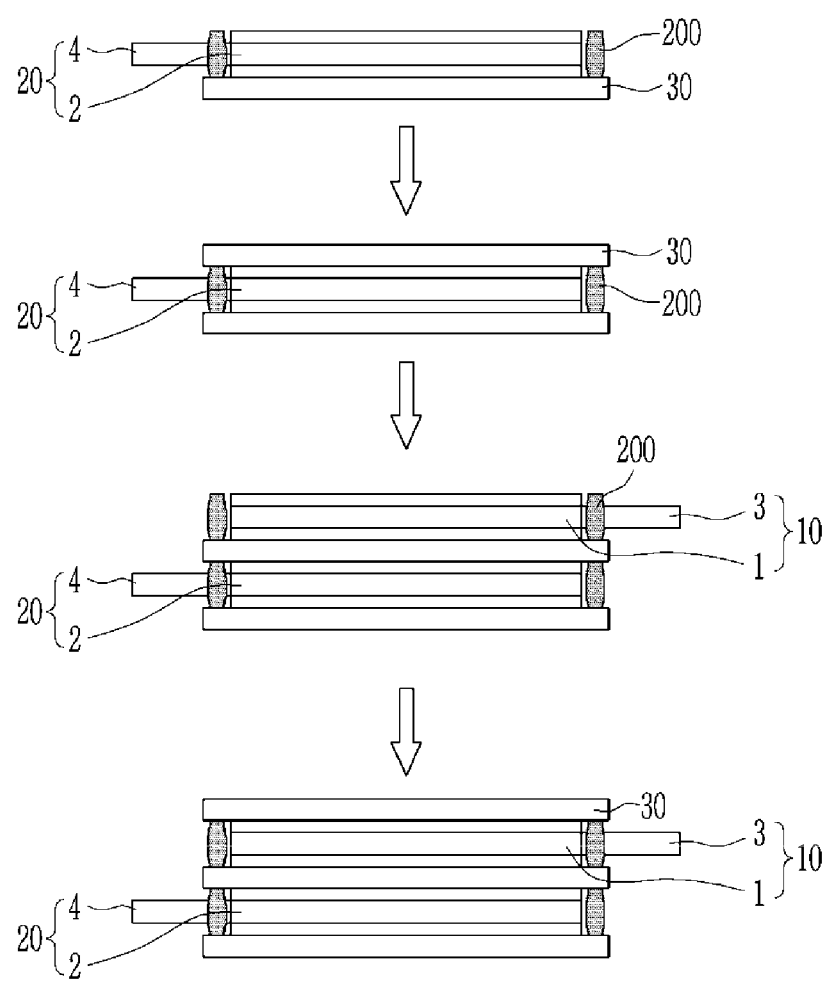
FIG. 4 illustrates a view for describing a method of forming the electrode assembly of FIG. 2 and FIG. 3.

FIG. 4 illustrates a view for describing a method of forming the electrode assembly of FIG. 2 and FIG. 3.

As illustrated in FIG. 4, the fixing member 200 may be formed by repeating processes of disposing the positive electrode 20 on the separator 30, forming the fixing member 200 at the edge of the separator 30, disposing the separator 30 and the negative electrode 10, and forming the fixing member 200 at the edge of the separator 30. In an embodiment, the process of forming the fixing member 200 includes applying a solution adhesive to the edge and curing it.

In an embodiment, the fixing member 200 may be formed of a solution-type adhesive capable of thermosetting or UV curing, and the fixing member 200 may be a material having excellent adhesion to the separator 30 but inferior adhesion to the metal sheets of the positive electrode 20 and the negative electrode 10. In an embodiment, the fixing member 200 may include a polyolefin grafted with maleic anhydride. In this case, the polyolefin may be any of polypropylene, polyethylene, and ethylene vinyl acetate (EVA).

The solution-type adhesive may be applied to the separator 30, and then move along the surface of the separator 30. Therefore, after the solution-type adhesive is applied to the edge, viscosity and an amount of application of the solution-type adhesive may be adjusted so as to not contact the end of the positive electrode 20 or the negative electrode 10 while moving along the surface of the separator 30.

In an embodiment, thermal curing or UV curing is rapidly performed after application to block the contact between the solution-type adhesive and the ends of the positive electrode 20 and the negative electrode 10.

In an embodiment, the fixing member 200 is formed at a regular interval along the edge of the separator 30, and is formed to overlap at a same position.

Figure 5:
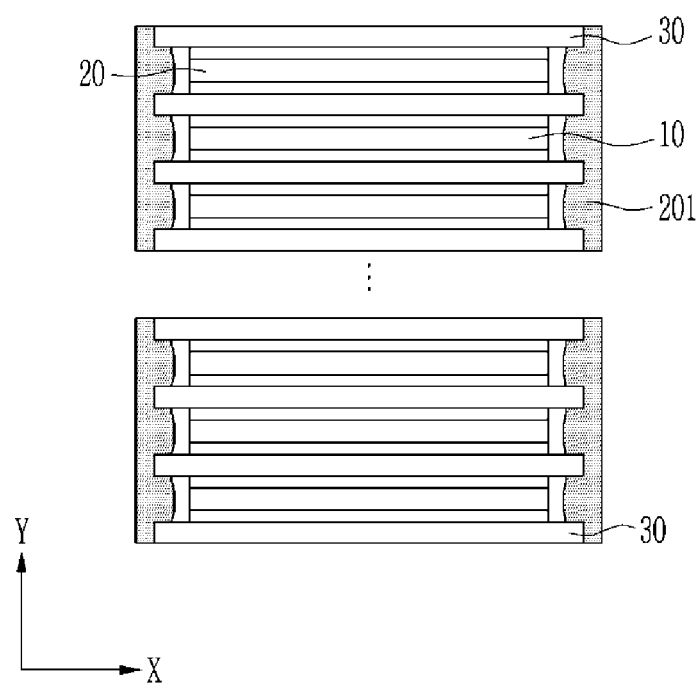
FIG. 5 illustrates a schematic cross-sectional view of an electrode assembly according to another embodiment of the present invention, taken along a line corresponding to the line III-III of FIG. 1.

FIG. 5 illustrates a schematic cross-sectional view of an electrode assembly according to another embodiment of the present invention, taken along a line corresponding to the line III-III of FIG. 1.

Since the electrode assembly shown in FIG. 5 may be almost the same as that shown in FIG. 2 and FIG. 3, only different parts may now be described in further detail.

As illustrated in FIG. 5, an electrode assembly 101 includes the positive electrode 20 and the negative electrode 10 that are repeatedly stacked with the separator 30 interposed therebetween. The separator 30 is formed larger than the positive electrode 20 and the negative electrode 10, and a protruding edge thereof is fixed in contact with a fixing member 201.

In this case, the fixing member 201 may be formed to contact the end of the separator 30 as well as the surfaces of the separators 30 facing each other.

The fixing member 200 of FIG. 2 and FIG. 3 is in contact with the surfaces of the separators 30 facing each other, while the fixing member 201 of FIG. 5 is in contact not only with the surfaces of the separators 30 facing each other, but also with the ends of the separators 30, and, thus, the area between the fixing member 201 and the separator 30 is wider.

As such, as the area in which the separator 30 and the fixing member 201 come into contact with each other is increased, the separators 30 may be more firmly fixed, and thus the alignment of the stacked electrode assembly 101 may be more effectively prevented from being misaligned.

Figure 6:
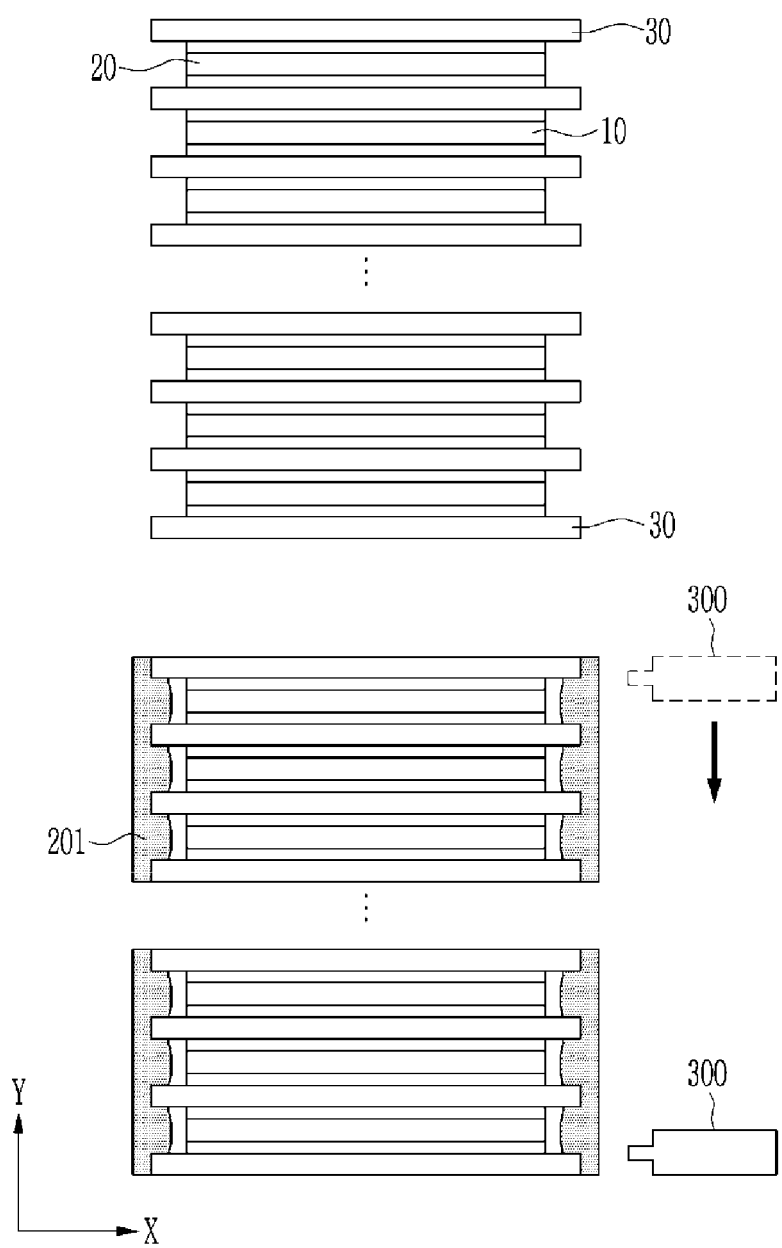
FIG. 6 illustrates a view for describing a method of forming the electrode assembly of FIG. 5.

FIG. 6 illustrates a view for describing a method of forming the electrode assembly of FIG. 5.

As illustrated in FIG. 6, an electrode assembly in which the positive electrode 20, the separator 30, and the negative electrode 10 are stacked is prepared, and the solution-type adhesive is applied to the end of the separator 30 by using a nozzle-type applicator 300, and then is cured to form the fixing member 201.

In an embodiment, the fixing member 201 may include a solution-type adhesive capable of thermosetting or UV curing, and may include a material having excellent adhesion to the separator 30 but inferior adhesion to the metal sheets of the positive electrode 20 and the negative electrode 10. In an embodiment, the fixing member 201 may include a polyolefin grafted with maleic anhydride. In this case, the polyolefin may be any of polypropylene, polyethylene, and ethylene vinyl acetate (EVA).

The solution-type adhesive may be applied to the separator 30, and then move along the surface of the separator 30. Therefore, after the solution-type adhesive is applied to the edge, a concentration and an amount of application of the solution-type adhesive may be adjusted so as to not contact the end of the positive electrode or the negative electrode while moving along the surface of the separator 30.

In an embodiment, thermal curing or UV curing is rapidly performed after application to prevent or substantially prevent contact between the solution-type adhesive and the ends of the positive electrode and the negative electrode.

In an embodiment, since the fixing member 201 is applied by using the nozzle-type applicator 300, the fixing member 201 may be formed in a continuous linear shape in the direction Y across a sidewall of the electrode assembly 101, but the present invention is not limited thereto, and it may be formed discontinuously (not illustrated) at a regular interval along the direction Y crossing the sidewall or a longitudinal direction X of the sidewall.

FIG. 7 to FIG. 10 illustrate views for describing a fixing member according to other embodiments of the present invention.

As illustrated in FIG. 7 to FIG. 10, a fixing member 202, 203, 204, 205 may be formed across the sidewall of an electrode assembly 102, 103, 104, 105 in various forms.

Figure 7:
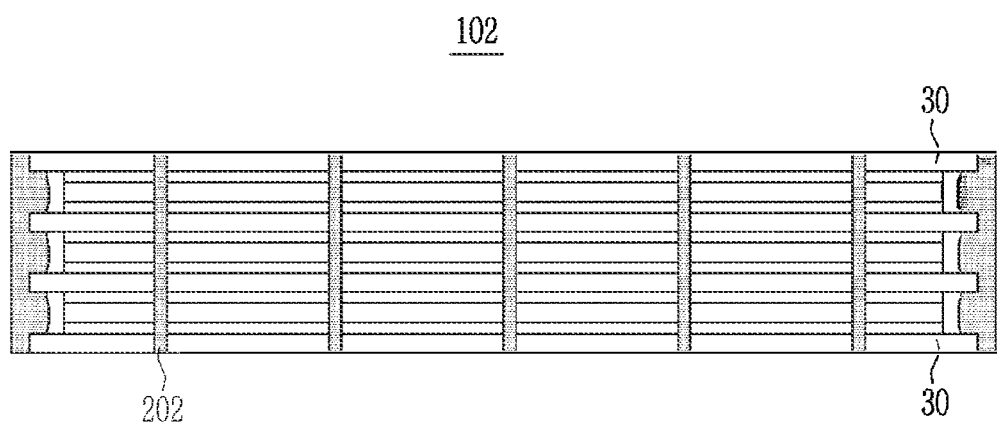
FIG. 7 to FIG. 10 illustrate views for describing a fixing member according to other embodiments of the present invention.
Figure 8:
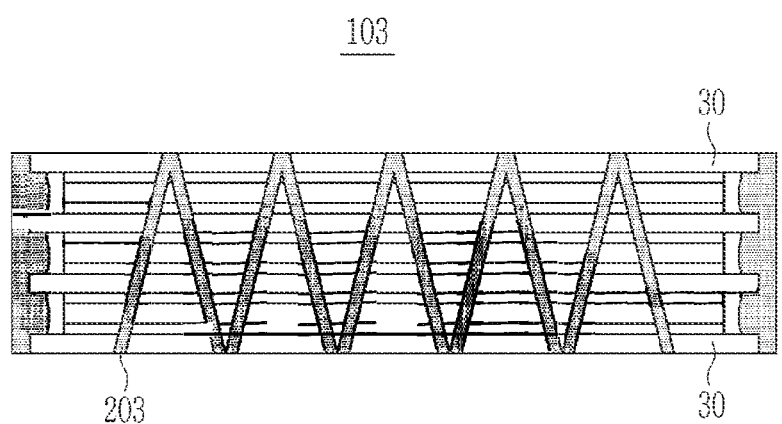
Figure 9:
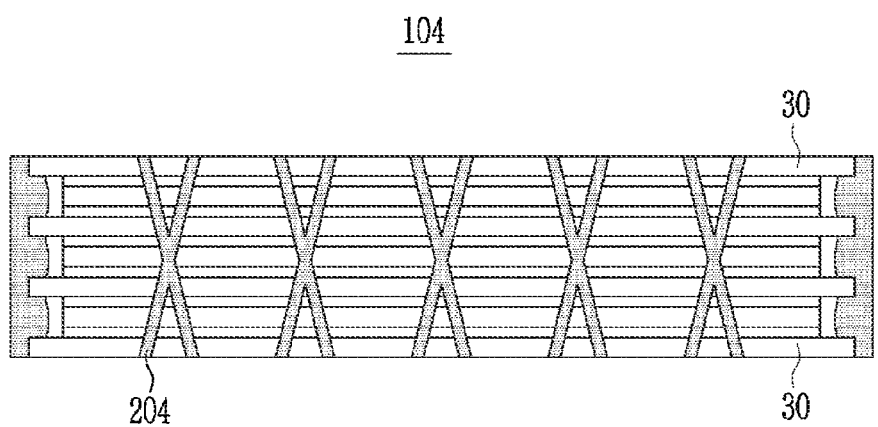
Figure 10:
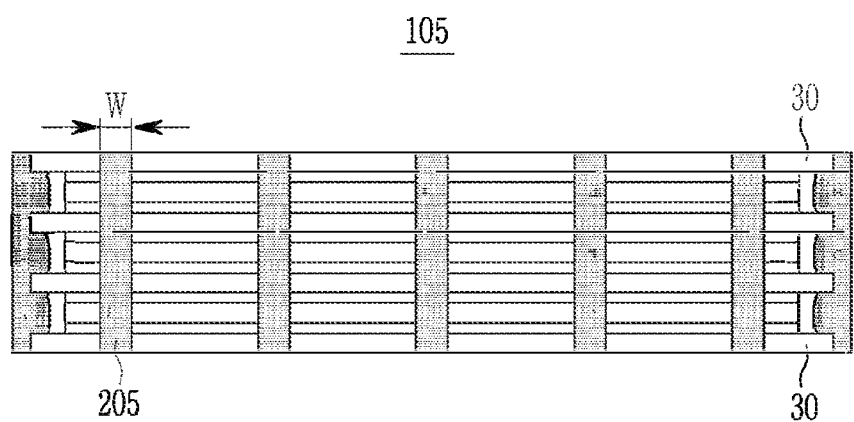

As illustrated in FIG. 7, the fixing member 202 may be formed perpendicularly with respect to upper and lower surfaces of the electrode assembly 102, or, as illustrated in FIG. 8 and FIG. 9, a fixing member 203 or 204 may be formed to be inclined with respect to an upper surface or a lower surface of an electrode assembly 103 or 104. In addition, as illustrated in FIG. 10, a fixing member 205 may be formed to have a width W that is wider than that of the fixing members 202, 203, and 204 of FIG. 7 to FIG. 9.

In an embodiment, an area corresponding to the sidewall is formed to be 95% or less of a total sidewall area such that the fixing members 202, 203, 204, and 205 do not block penetration of the electrolyte solution.

Figure 11:
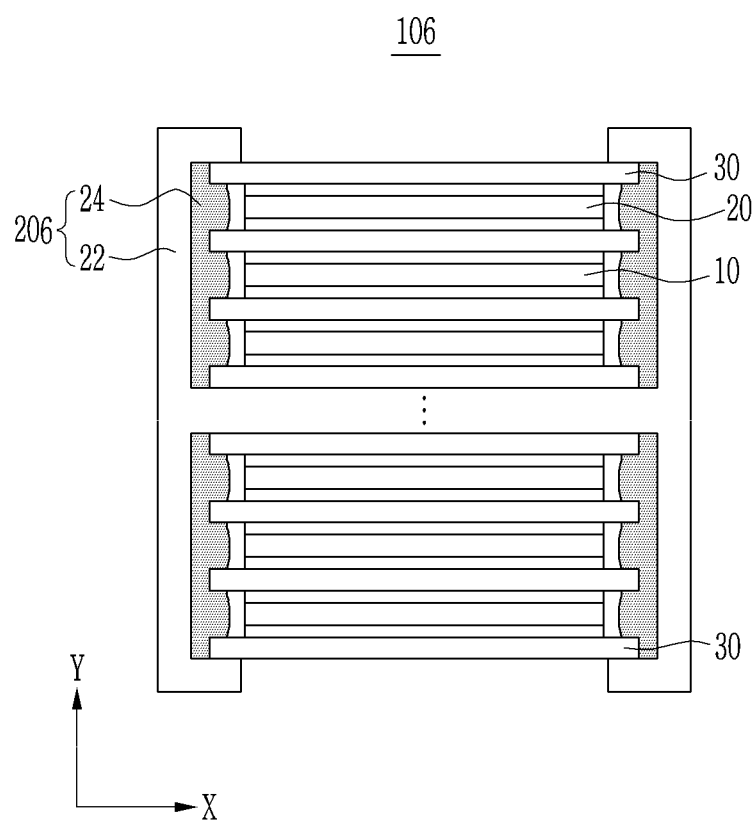
FIG. 11 illustrates a schematic cross-sectional view of an electrode assembly according to another embodiment of the present invention, taken along a line corresponding to the line III-III of FIG. 1.

FIG. 11 illustrates a schematic cross-sectional view of an electrode assembly according to another embodiment of the present invention, taken along a line corresponding to the line III-III of FIG. 1.

Since the electrode assembly shown in FIG. 11 may be almost the same as that shown in FIG. 3, only different parts may now be described in further detail.

As illustrated in FIG. 11, an electrode assembly 106 includes the positive electrode 20 and the negative electrode 10 that are repeatedly stacked with the separator 30 interposed therebetween. The separator 30 is formed to be larger than the positive electrode 20 and the negative electrode 10, and a fixing member 206 is attached to a protruding edge thereof.

The fixing member 206 may include an insulating member 22 and an adhesive layer 24. Similar to the embodiment illustrated in FIG. 5, the adhesive layer 24 may be formed to contact the end of the separator 30 as well as the surfaces of the separators 30 facing each other.

In addition, the insulating member 22 may be formed to surround upper and lower surfaces of the electrode assembly 106 together with the adhesive layer 24. Accordingly, upper and lower end portions of the insulating member 22 on which the adhesive layer 24 is not formed may have adhesiveness and may be attached to the upper and lower surfaces of the electrode assembly 106.

As in the above-described embodiment, when the insulating member 22 having adhesiveness is formed together with the adhesive layer 24, the insulating member 22 is attached to the upper and lower surfaces of the electrode assembly 106 to fix the fixing member 206 and the upper and lower surfaces of the electrode assembly 106, whereby an area contacted by the electrode assembly 106 may be increased to more firmly maintain the alignment of the electrode assembly 106.

Figure 12:
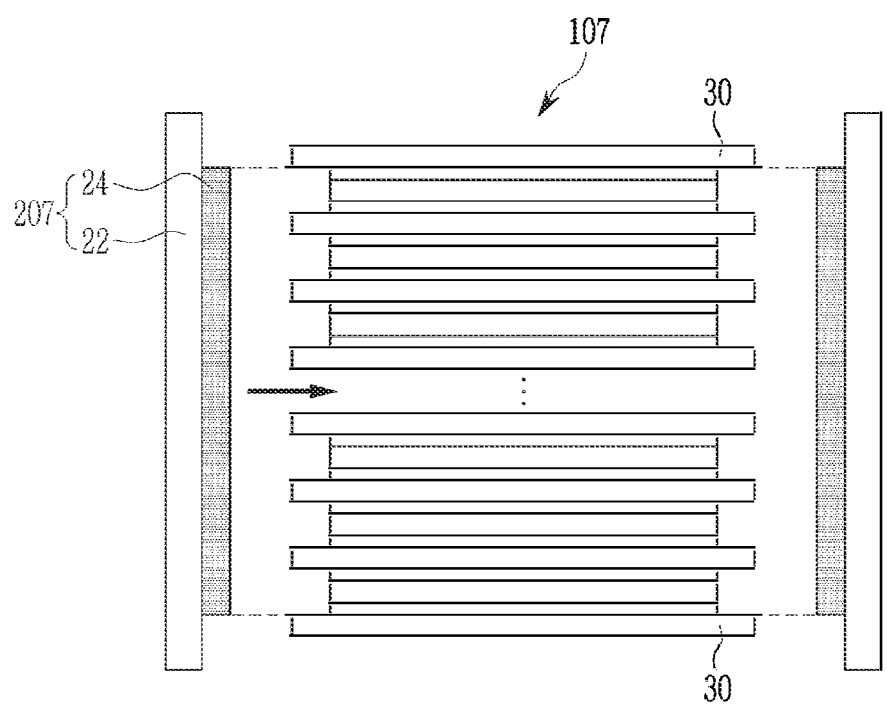
FIG. 12 and FIG. 13 illustrate views for describing a method of forming a fixing member in an electrode assembly according to embodiments of the present invention.
Figure 13:
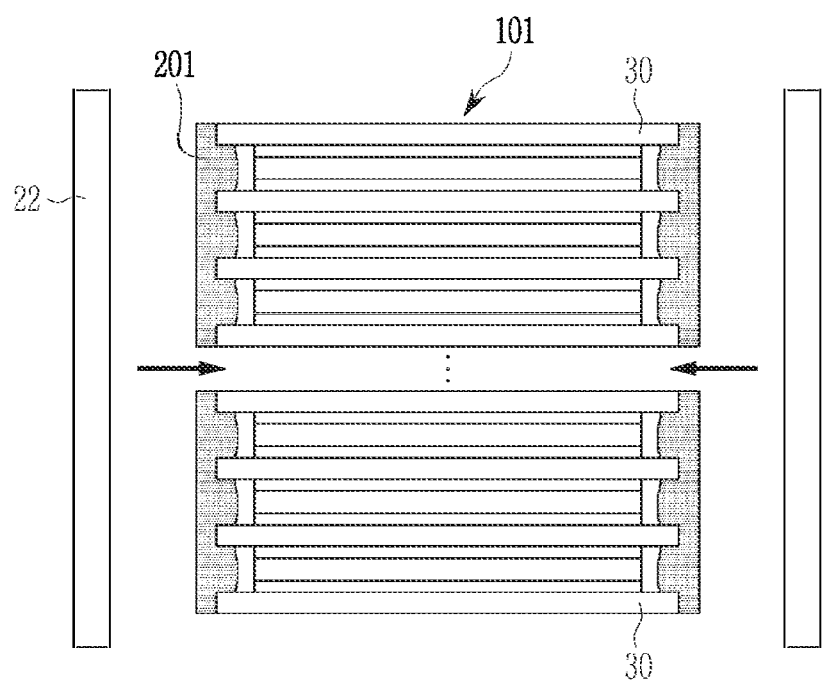

In embodiments, the electrode assembly described in FIG. 11 may be formed by methods of FIG. 12 and FIG. 13.

FIG. 12 and FIG. 13 illustrate views for describing a method of forming a fixing member in an electrode assembly according to embodiments of the present invention.

As illustrated in FIG. 12, an electrode assembly 107 including the stacked positive electrode 20, the separator 30, and the negative electrode 10 and a fixing member 207 is prepared.

The fixing member 207 may include an adhesive layer 24 and an insulating member 22. The fixing member 207 may have adhesiveness, and the adhesive layer 24 may be a hot melt adhesive that melts when a certain (e.g., predetermined) temperature is applied. Since the hot melt adhesive does not use an organic solvent, a risk due to the use of the organic solvent may be reduced.

In an embodiment, the adhesive layer 24 may include a polymer selected from the group consisting of cellulose, polyvinylidene fluoride-cohexafluoropropylene, polyvinylidene fluoridecotrichloroethylene, polymethylmethacrylate, polybutylacrylate, polybutylacrylate acrylonitrile, polyvinylpyrrolidone, polyvinylacetate, ethylene vinyl co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, a maleic acid anhydride-polypropylene, and a mixture of two or more thereof, and, in an embodiment, may include polypropylene-maleic acid anhydride.

Thereafter, the fixing member 207 is disposed such that the adhesive layer 22 is disposed on a sidewall of the electrode assembly 107 and is heated to melt the adhesive layer 24, and then the adhesive layer 24 is adhered to the separator 30 by removing the heat and curing it. In an embodiment, the adhesive layer 24 may be adhered between adjacent separators while being cured by UV.

The adhesive layer 24 may move to an end of the positive electrode 20 or the negative electrode 10 during curing depending on viscosity, and, thus, the thickness, viscosity, melting temperature, time, etc. of the adhesive layer 24 may be adjusted such that the adhesive layer 24 does not come into contact with the ends of the positive electrode 20 and the negative electrode 10 even when the adhesive layer 24 moves between the separators 30. For example, the adhesive layer 24 may have viscosity of 500 cP or more. In the case of using heat, when the adhesive layer 24 is melted by heat to viscosity of 500 cP or more and then the heat is removed, the adhesive layer 24 may be cured before contacting the ends of the positive and negative electrodes. In an embodiment, when UV is used, the adhesive layer 24 may be formed using an adhesive having viscosity of 500 cP to prevent or substantially prevent the adhesive from moving during curing with UV.

In an embodiment, referring to FIG. 13, the insulating member 22 having adhesiveness may be further attached onto an adhesive layer, which may be the fixing member 201 of the electrode assembly 101 illustrated in FIG. 5.

In one or more embodiments, the above electrode assembly may be assembled as a rechargeable battery by being inserted into a can-shaped case (not illustrated) together with an electrolyte solution, and then sealing the case with a cap plate connectable to an external terminal.

While the present invention has been described in connection with what are presently considered to be some practical embodiments, it is to be understood that the invention is not limited to the disclosed embodiments, but, on the contrary, is intended to cover various modifications and equivalent arrangements included within the spirit and scope of the appended claims.

What is claimed is:
1. An electrode assembly comprising:
   a plurality of positive electrodes and a plurality of negative electrodes, alternately and repeatedly stacked;
   a separator between the positive electrodes and the negative electrodes, respectively, to protrude from the posi- tive electrodes and the negative electrodes and stacked such that surfaces at edges of the separator face each other;

a fixing member comprising an adhesive layer adhered to the surfaces of the separator at an end where an uncoated region of the positive electrodes and an uncoated region of the negative electrodes is formed, the adhesive layer being arranged at opposite sides of the electrode assembly; and an insulating member adhered to an upper surface of the separator and a lower surface of the separator, wherein the insulating member is disposed on the separator in a direction crossing the electrode assembly.

2. The electrode assembly of claim 1, wherein the insulating member comprises at least two insulating members.

3. The electrode assembly of claim 2, wherein the insulating members overlap each other in the direction crossing the electrode assembly.

4. The electrode assembly of claim 1, wherein the adhesive layer is spaced apart from ends of the positive electrodes and the negative electrodes.

5. The electrode assembly of claim 1, wherein the adhesive layer surrounds ends of the separator.

6. The electrode assembly of claim 1, wherein the fixing member is disposed on a surface of the electrode assembly with the adhesive layer.

7. The electrode assembly of claim 1, wherein the adhesive layer is arranged at a regular interval along the edges of the separator.

8. The electrode assembly of claim 1, wherein the adhesive layer is continuously linear in a direction in which the separator overlaps.

9. The electrode assembly of claim 8, wherein the adhesive layer is inclined with respect to the direction in which the separator overlaps.

10. The electrode assembly of claim 1, wherein the separator comprises a polyolefin series, and the fixing member comprises a polyolefin grafted with maleic anhydride.

* * * * *